J. SPARKS.
BUTTONHOLE SCISSORS.
APPLICATION FILED AUG. 29, 1912.
1,065,741.
Patented June 24, 1913.
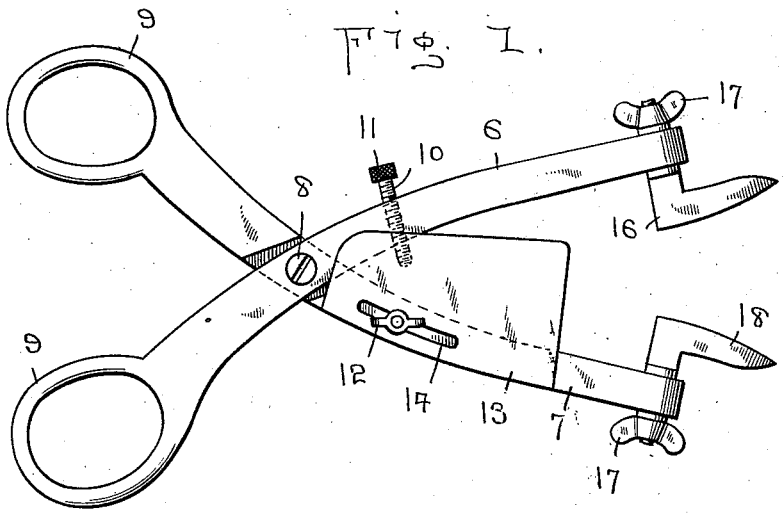
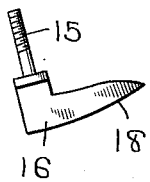
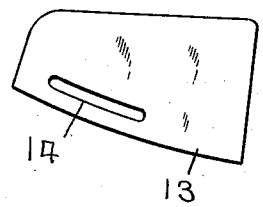

UNITED STATES PATENT OFFICE.

JOSIAH SPARKS, OF UNIVERSITY PLACE, NEBRASKA.

BUTTONHOLE-SCISSORS.

1,065,741.

Specification of Letters Patent.

Patented June 24, 1913.

Application filed August 29, 1912. Serial No. 717,738.

*To all whom it may concern:*

Be it known that I, JOSIAH SPARKS, a citizen of the United States, residing at University Place, in the county of Lancaster and State of Nebraska, have invented certain new and useful Improvements in Buttonhole-Scissors; and I do hereby declare the following to be a full, clear, and exact description of the invention, such as will enable others skilled in the art to which it appertains to make and use the same.

My invention relates to scissors and more particularly to that class known as button hole scissors.

The main object of my invention is to provide a pair of button hole scissors having adjustable blades, whereby button holes of desired length may be formed at any angle to the edge of the cloth.

Another object of my invention is to provide a pair of button hole scissors having means thereon for gaging the distance from the edge of the cloth to the point where it is desired to form a button hole.

In the accompanying drawings, Figure 1 is a side elevation of a pair of scissors constructed in accordance with my invention. Fig. 2 is a side elevation of one of the blades removed, and, Fig. 3 is a similar view of the gage blade.

Referring to the drawings in which similar reference characters designate corresponding parts throughout the several views, 6 and 7 indicate a pair of members recessed about midway thereof, and pivoted upon a bolt 8 at said recessed portion, whereby the opposite ends thereof move in the same plane when operated. One end of each of the members 6 and 7 is provided with a handle 9, whereby the device may be readily grasped by the hand of the operator. Upon the opposite side of the bolt 8, and adjacent thereto, the upper member 6 is provided with a threaded opening through which takes the threaded pin 10 having a milled head 11 thereon, for a purpose which will soon appear. The lower member 7 adjacent the bolt 8 is provided with a laterally disposed winged nut 12 which is preferably threaded into the side of said member 7 and is adapted to retain in an adjusted position the gage plate 13, having the slot 14 adjacent its lower edge.

The extreme ends of the members 6 and 7 opposite the handles 9 are provided with openings through which are extended the laterally extending threaded shanks 15 carried by the adjustable blades 16. The free ends of the threaded shanks 15 are of sufficient length to extend through the members 6 and 7, and have threaded on their outer ends winged nuts 17, which are adapted when tightened to retain the blades 16 at the desired angle to the members 6 and 7.

It will be understood that the sharpened edges 17 of the blades 16 are slightly curved, pointed at their forward ends and end abruptly at their rear ends, which carry the shanks 15. When it is desired to cut a button-hole adjacent to the edge of a piece of cloth and at right angles to the edge, the blades 16 are turned within the members 6 and 7 to the position shown in Fig. 1, and locked in this position by means of the winged nuts 17. The gage plate 13 is then adjusted by means of the winged nut 12, the desired distance from the rear end of the cutting edges 18, whereby the holes are formed in the cloth a predetermined distance from the edge thereof. For adjusting the stroke of cutting of the blades 16, the threaded pin 10 is moved inwardly or outwardly by means of the milled head 11. When it is desired to cut a button hole at an angle to the edge of the cloth, it will be seen that the blades 16 may be readily turned at any angle with relation to the members 6 and 7 by loosening the winged nuts 17, said nuts being again tightened after adjusting the blades 16 for retaining the latter in adjusted position.

From the foregoing, it will be seen that the main feature of novelty of my invention resides in the peculiar formation and adjustability of the blades 16, whereby said blades may be turned to cut at any angle to the working edge of the cloth or other object worked upon.

What I claim is:

1. A pair of buttonhole scissors comprising a pair of handle members, a pair of blades, threaded shanks carrying said blades, and means for adjustably securing said shanks to said members.

2. A pair of buttonhole scissors comprising a pair of pivoted handle members, shanks adjustably mounted in the ends of said handle members, and laterally projecting blades carried by said shanks.

In testimony whereof I have signed my name to this specification in the presence of two subscribing witnesses.

JOSIAH SPARKS.

Witnesses:
T. M. WIMBERLEY,
INA E. WIMBERLEY.

---

Copies of this patent may be obtained for five cents each, by addressing the "Commissioner of Patents, Washington, D. C."